(12) United States Patent
Suh et al.

(10) Patent No.: US 11,007,998 B1
(45) Date of Patent: May 18, 2021

(54) HYBRID VEHICLE

(71) Applicants: HYUNDAI MOTOR COMPANY, Seoul (KR); KIA MOTORS CORPORATION, Seoul (KR)

(72) Inventors: Buhm Joo Suh, Hwaseong-si (KR); Dong Hee Han, Seongnam-si (KR); Jinkuk Cho, Hwaseong-si (KR); Kwanhee Lee, Suwon-si (KR); Sungchan Na, Seongnam-si (KR); Yeongseop Park, Seoul (KR); Jihyun Park, Hwaseong-si (KR); Seungwoo Hong, Seoul (KR); Yong Kak Choi, Seoul (KR); Hyunjin Kang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/884,645

(22) Filed: May 27, 2020

(30) Foreign Application Priority Data

Dec. 5, 2019 (KR) .......................... 10-2019-0161026

(51) Int. Cl.
| | |
|---|---|
| *B60W 20/20* | (2016.01) |
| *B60W 10/06* | (2006.01) |
| *B60W 10/08* | (2006.01) |
| *B60K 6/24* | (2007.10) |
| *B60K 6/26* | (2007.10) |
| *F02D 41/00* | (2006.01) |

(Continued)

(52) U.S. Cl.
CPC ............. *B60W 20/20* (2013.01); *B60K 6/442* (2013.01); *B60K 11/02* (2013.01); *B60W 10/06* (2013.01); *B60W 10/08* (2013.01); *F02B 39/10* (2013.01); *B60K 6/24* (2013.01); *B60K 6/26* (2013.01); *B60K 6/38* (2013.01); *B60W 2510/0628* (2013.01); *B60W 2510/0671* (2013.01)

(58) Field of Classification Search
CPC ...... B60W 20/20; B60W 10/06; B60W 10/08; B60W 2510/0628; B60W 2510/0671; B60K 6/442; B60K 6/24; B60K 6/26; B60K 6/38; B60K 11/02; F02B 39/10; F02B 37/04; F02D 41/0007
See application file for complete search history.

(56) References Cited

U.S. PATENT DOCUMENTS

| | | | |
|---|---|---|---|
| 10,280,850 B1 * | 5/2019 | Zeng ........................ | F02B 37/18 |
| 10,619,545 B2 * | 4/2020 | Park, II .............. | B01D 53/9454 |

(Continued)

*Primary Examiner* — Tisha D Lewis
(74) *Attorney, Agent, or Firm* — Brinks Gilson & Lione

(57) ABSTRACT

A hybrid vehicle may include: an engine; a drive motor assisting a driving torque of the engine; an engine clutch selectively delivering power between the engine and the drive motor; a first intake valve disposed in a first intake line; a second intake valve disposed in a second intake line; a first electric supercharger disposed in the first intake line; a second electric supercharger disposed in the second intake line; a connecting valve disposed in a connecting line for connecting the first intake line and the second intake line; and a controller determining an operating mode among a plurality of operating modes of the first and the second electric superchargers based on a pressure ratio and a flow rate of the intake air supplied by each of the first and the second electric superchargers.

10 Claims, 10 Drawing Sheets

(51) Int. Cl.
  *B60K 6/442* (2007.10)
  *B60K 11/02* (2006.01)
  *F02B 39/10* (2006.01)
  *B60K 6/38* (2007.10)

(56) References Cited

U.S. PATENT DOCUMENTS

2004/0247461 A1\* 12/2004 Pflueger ................ F04D 17/122
                                                        417/407
2009/0107142 A1\* 4/2009 Russell ............... F02D 41/0007
                                                        60/608
2018/0163616 A1\* 6/2018 Han .................... F02D 41/0007
2019/0186390 A1\* 6/2019 Kelly ...................... F02B 33/40
2020/0182202 A1\* 6/2020 Hong ..................... F02M 26/41

\* cited by examiner

HYBRID VEHICLE

CROSS-REFERENCE TO RELATED APPLICATION

This application claims priority to and the benefit of Korean Patent Application No. 10-2019-0161026, filed on Dec. 5, 2019, the entire contents of which are incorporated herein by reference.

FIELD

The present disclosure relates to a hybrid vehicle. More particularly, the present disclosure relates to a hybrid vehicle that can realize a high compression ratio engine and improve a driving efficiency of an electric supercharger.

BACKGROUND

The statements in this section merely provide background information related to the present disclosure and may not constitute prior art.

A hybrid vehicle is a vehicle using two or more power sources and generally refers to a hybrid electric vehicle driven using an engine and a motor. A hybrid electric vehicle may form various structures using two or more power sources including an engine and a motor.

The engine applied to the hybrid vehicle appropriately mixes air and fuel and generates driving power by burning the mixed gas, and the motor assists the power of the engine, if desired.

In order to obtain desired output power and combustion efficiency, sufficient air should be supplied to the engine. For this, a turbocharger is used to increase combustion efficiency and supply sufficient air to the engine.

Generally, a turbine of the turbocharger is rotated by pressure of exhaust gas discharged from the engine, a compressor of the turbocharger compresses fresh air flowing in from the outside, and the compressed air is supplied to a cylinder of the engine. The turbocharger has been applied to most diesel engines, and has recently been applied to gasoline engines.

As another example, there is an electric supercharger that compresses external air using a compressor operated by a motor. Since the electric supercharger is operated by the motor, there is little turbo lag. The electric supercharger mainly supplies compressed air to the cylinder in a low speed and low load region.

We have discovered that the turbocharger (hereinafter referred to as a 'mechanical turbocharger') operated by exhaust gas has low responsiveness, and there is a problem in realizing an engine having a high compression ratio because of high back pressure. Also, since the turbocharger is exposed to high temperature exhaust gas (i.e., Celsius 700 degrees), design cost of peripheral parts of the turbocharger is increased.

In addition, since the motor output of the electric supercharger is limited, the boosting region by the electric supercharger is limited to a low-speed and a middle-speed region. Further, electrical energy is desired to operate the electric supercharger and compression work of the engine according to capacity of the electric supercharger is limited.

The above information disclosed in this Background section is only for enhancement of understanding of the background of the present disclosure, and therefore it may contain information that does not form the prior art that is already known in this country to a person of ordinary skill in the art.

SUMMARY

The present disclosure provides a hybrid vehicle that can improve power performance of the hybrid vehicle by utilizing a electric supercharger and fuel efficiency in a middle-load and a high-load regions.

In one form of the present disclosure, a hybrid vehicle may include: an engine including a plurality of cylinders generating driving torque by burning fuel; a drive motor generating driving torque through electric energy supplied from a battery and assisting the driving torque of the engine; an engine clutch disposed between the engine and the drive motor, and configured to selectively connect the engine to the drive motor; a first intake valve disposed in a first intake line in which intake air supplied to a combustion chamber flows; a second intake valve disposed in a second intake line in which intake air supplied to the combustion chamber flows; a first electric supercharger disposed in the first intake line; a second electric supercharger disposed in the second intake line; a connecting valve disposed in a connecting line for connecting the first intake line and the second intake line; and a controller determining an operating mode among a plurality of operating modes of the first and the second electric superchargers based on a pressure ratio and a flow rate of the intake air supplied by each of the first and the second electric superchargers.

The plurality of operating modes may include a single mode, a serial mode, or a parallel mode. In particular, the single mode may be a mode in which intake air compressed by one of the first and second electric superchargers is supplied to the combustion chamber, the serial mode may be a mode in which intake air is compressed in series by the first electric supercharger and the second electric supercharger and supplied to the combustion chamber, and the parallel mode may be a mode in which intake air compressed in parallel by the first electric supercharger and intake air compressed by the second electric supercharger, respectively, are supplied to the combustion chamber.

The controller may control the first and the second electric superchargers to be operated in the serial mode when the pressure ratio supplied by one of the first and second electric superchargers does not satisfy a boost pressure in the combustion chamber to run the engine within an optimal efficiency operating region.

The controller may control the first and the second electric superchargers to be operated in the parallel mode when the flow rate of the intake air supplied by one of the first and second electric superchargers does not satisfy a flow rate of the intake air into the combustion chamber to run the engine within an optimal efficiency operating region.

In the single mode, the controller may control the second intake valve and the connecting valve to be closed, the second electric supercharger to be stopped, the first intake valve to be opened and the first electric supercharger to operated such that the intake air compressed by the first electric supercharger is supplied to the combustion chamber, or the controller may control the first intake valve and the connecting valve to be closed, the first electric supercharger to be stopped, the second intake valve to be opened, and the second electric supercharger to be operated such that the intake air compressed by the second electric supercharger is supplied to the combustion chamber.

In the serial mode, the controller may control the first intake valve and the second intake valve to be closed, the connecting valve to be opened, and the first electric supercharger and the second electric supercharger to be operated such that the intake air doubly compressed by the first and the second electric superchargers is supplied to the combustion chamber.

In the parallel mode, the controller may control the connecting valve to be closed, the first intake valve and the second intake valve to be opened, and the first electric supercharger and the second electric supercharger to be operated such that the intake air compressed by each of the first and the second electric supercharger is separately supplied to the combustion chamber.

The first intake valve may be disposed a downstream portion of the first electric supercharger, and the second intake valve may be disposed an upstream portion of the second electric supercharger.

The hybrid vehicle according to an exemplary form of the present disclosure may further include a main intercooler disposed in a main intake line that the first intake line and the second intake line are merged.

The hybrid vehicle according to an exemplary form of the present disclosure may further include a complementary intercooler disposed in the connecting line.

According to an exemplary form of the present disclosure, new engine in which two intake lines supplying external air to the engine are provided and electric supercharges are installed at each intake line is applied to a hybrid vehicle, such that high compression ratio can be realized and control responsiveness can be improved by applying a new engine system to a hybrid vehicle.

And by using the new concept supercharging system for hybrid vehicles, engine output of hybrid vehicles can be improved and fuel efficiency in a middle-load region and a high-load region can be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
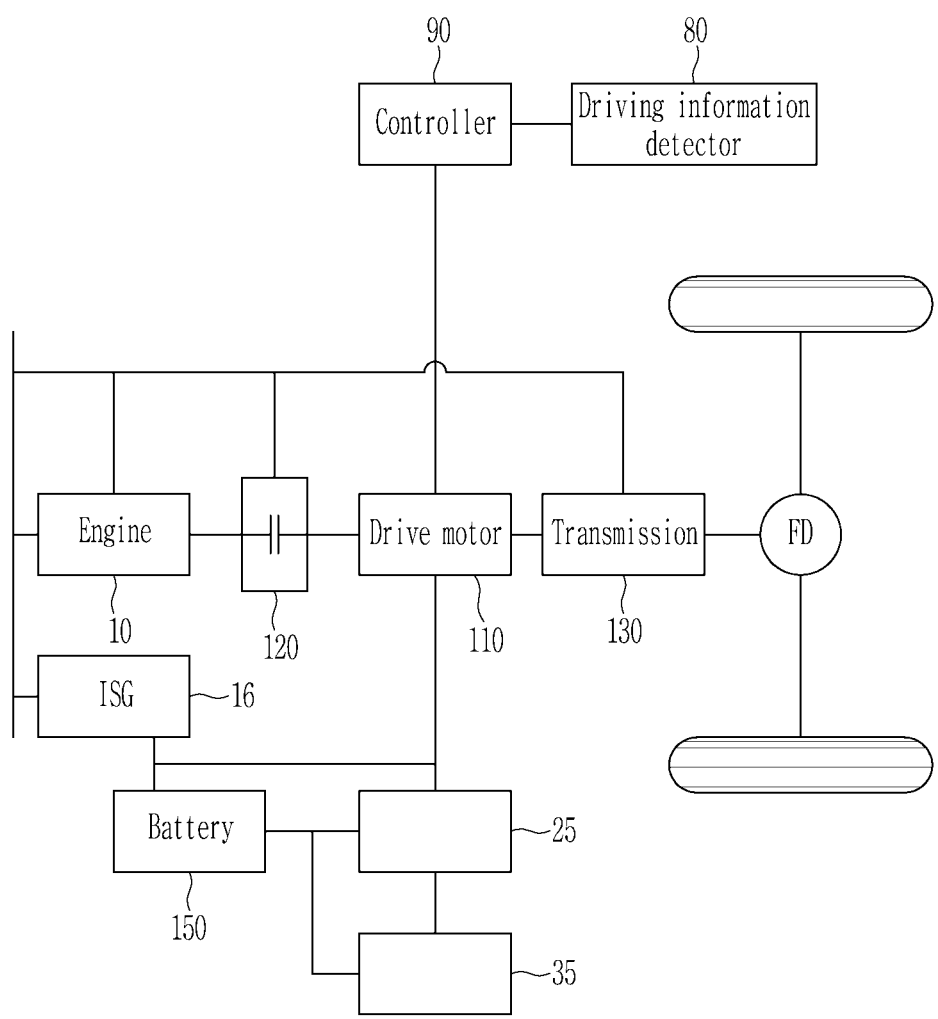
FIG. 1 is a schematic view illustrating a hybrid vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

In describing the present disclosure, parts that are not related to the description will be omitted.

In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity.

Herein, a hybrid vehicle according to an exemplary form of the present disclosure will be described in detail with reference to accompanying drawings.

Figure 2:
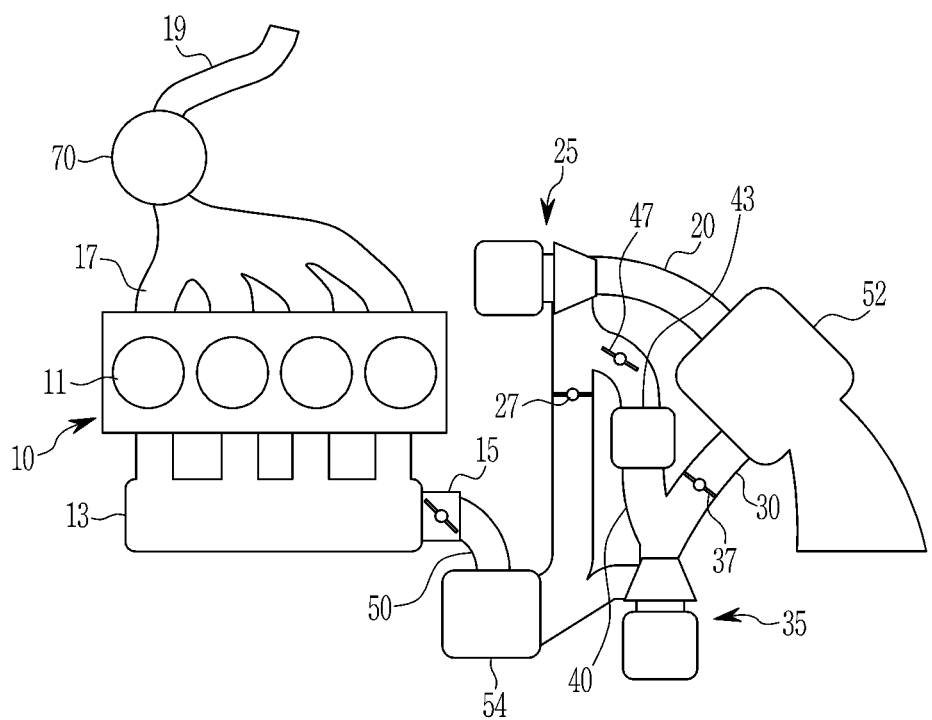
FIG. 2 is a schematic view illustrating an engine system applied to a hybrid vehicle according to an exemplary form of the present disclosure.
Figure 3:
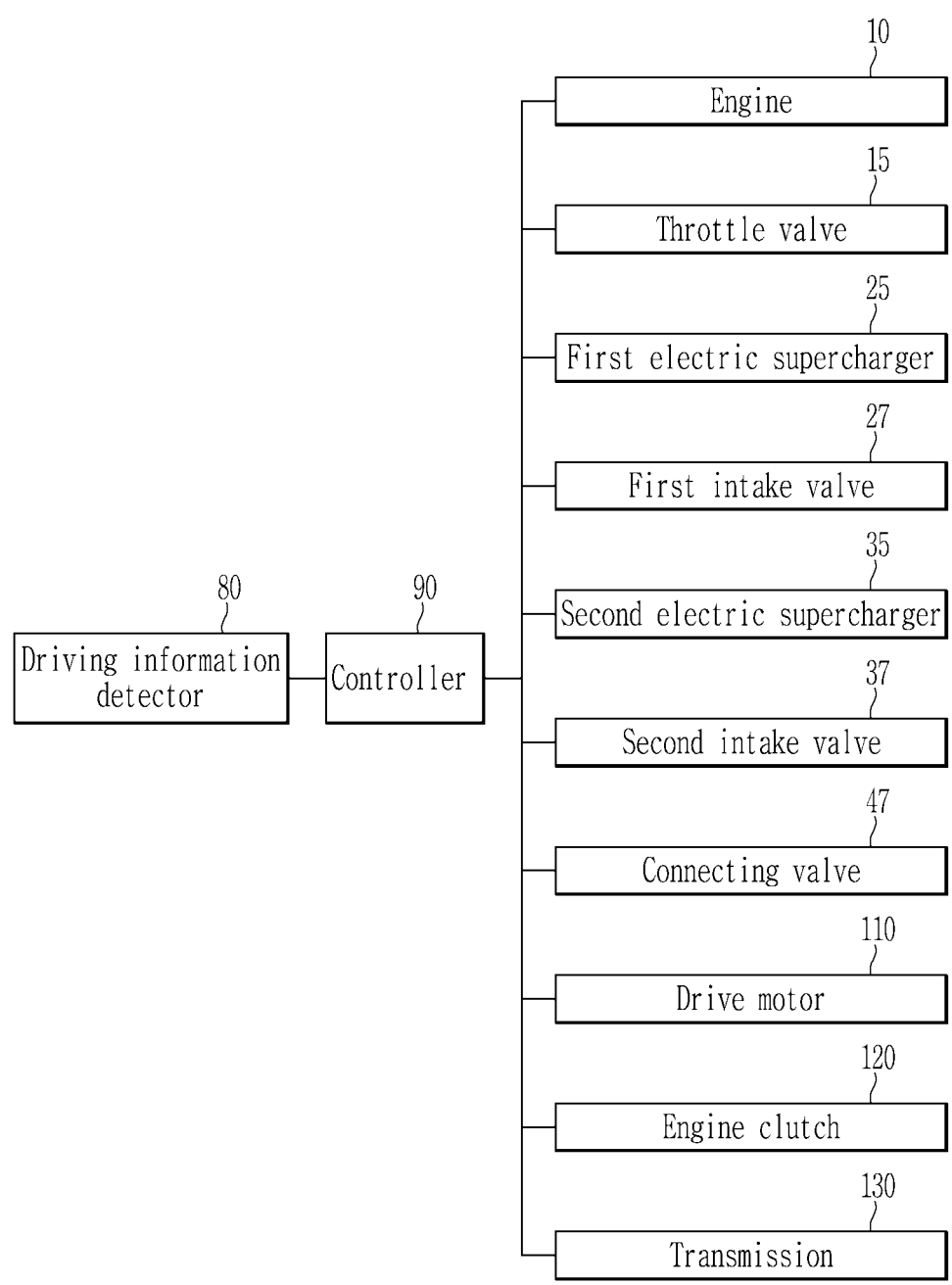
FIG. 3 is a block diagram illustrating a hybrid vehicle according to an exemplary form of the present disclosure.

FIG. 1 is a schematic view illustrating a hybrid vehicle according to an exemplary form of the present disclosure. FIG. 2 is a schematic view illustrating an engine system applied to a hybrid vehicle according to an exemplary form of the present disclosure. And FIG. 3 is a block diagram illustrating a hybrid vehicle according to an exemplary form of the present disclosure.

As shown in FIG. 1, a hybrid vehicle according to an exemplary form of the present disclosure is a vehicle that uses two or more power source and refers to a hybrid electric vehicle driven using an engine and a motor.

The hybrid vehicle uses a TMED (Transmission Mounted Electric Device) type power train in which a drive motor 110, a transmission 130, and a drive shaft are connected in series.

The engine may include a plurality of combustion chamber generating driving torque by burning fuel.

The drive motor 110 may generate driving torque through power supplied from a battery 150 and assist the engine output. The drive motor 110 may selectively operate as a generator and charge the battery 150.

In addition, an engine clutch is disposed between an engine and a motor, and the hybrid electric vehicle is driven in an electric vehicle (EV) mode or in a hybrid electric vehicle (HEV) mode, depending on whether the engine clutch is engaged.

When a driving mode of the hybrid vehicle is further subdivided, the driving mode of the hybrid vehicle may be divided into a HEV mode, an EV mode, and a charging mode.

The HEV mode is a mode in which the vehicle is driven by driving torque of the drive motor and the engine. In this case, the engine clutch between the engine and the drive motor 110 is engaged, and the vehicle is driven by the driving torque of the drive motor and the engine.

The EV mode is a mode in which a vehicle is driven by only driving torque of a drive motor. In this case, the engine clutch between the engine and the drive motor 110 is disengaged and an operation of the engine is stopped, and the vehicle is driven by only the driving torque of the drive motor.

The charging mode is a mode in which a vehicle is driven by only driving torque of a drive motor. Simultaneously, the engine maintains idle state and the battery 150 is charged through an integrated starter-generator (ISG) 16. Strictly speaking, the charging mode is a kind of the EV mode.

The integrated starter-generator (ISG) may start the engine and may charger the battery 150 by being selectively operated as a generator.

Referring to FIG. 2, intake air is supplied to the cylinder 11 of the engine 10 passing through a plurality of intake lines, and exhaust gas discharged from the cylinder 11 is exhausted to the outside through an exhaust manifold 17 and an exhaust line. In this case, a catalytic converter 70 is disposed in the exhaust line.

The plurality of intake lines includes a first intake line 20 and a second intake line 30 in which external air supplied to the cylinders 11 flows. However, this is not restrictive.

A connecting line 40 which connects the first intake line 20 and the second intake line 30 is disposed between the first intake line 20 and the second intake line 30. That is, the connecting line 40 is branched from the first intake line 20 and merged into the second intake line 30.

The electric superchargers 25, 35 disposed in the first intake line 20 and the second intake line 30, respectively, are for supplying compressed air to the cylinders. And the electric supercharger includes a motor and an electric compressor. The electric compressors are operated by the motor and compresses intake air, and the compressed intake air is supplied to the cylinders 11.

A first intake valve 27 is disposed in the first intake line 20. The first intake valve 27 may be disposed in a downstream portion of the first electric supercharger 25 dispose in the first intake line 20. Intake air amount supplied through the first intake line 20 is adjusted by opening of the first intake valve 27.

A second intake valve 37 is disposed in the second intake line 30. The second intake valve 37 may be dispose in a downstream portion of the second electric supercharger 35 disposed in the second intake line 30. Intake air amount supplied through the second intake line 30 is adjusted by opening of the second intake valve 37.

The first intake line 20 and the second intake line 30 are merged into a main intake line 50, and a main intercooler 54 is disposed in the main intake line 50. Supercharged air compressed by the electric supercharger is cooled by the main intercooler 54.

A connecting valve 47 is disposed in the connecting line 40. A complementary intercooler 43 may be disposed in the connecting line 40. Supercharge air compressed by the first electric supercharger 25 is cooled by the complementary intercooler 43.

An air cleaner 52 for filtering external air is disposed in an entrance of the first intake line 20 and the second intake line 30.

External air inflowing through the first intake line 20 and the second intake line 30 is supplied to the cylinders 11 through an intake manifold 13. A throttle valve 15 is disposed in the intake manifold 13, and adjusts air amount supplied to the cylinder 11.

The engine system according to an exemplary form of the present disclosure may further include a driving information detector 80 detecting driving information of a vehicle, and a controller 90 controlling operations of the engine, the drive motor 110, the engine clutch, the ISG, the first intake valve 27, the second intake valve 37, the bypass valve 47, the first electric supercharger 25, the second electric supercharger 35, and the throttle valve 15 based on the driving information.

The driving information detector 80 detects the driving information including an engine torque, an engine speed, and a desired torque of a driver. The driving information is transmitted to the controller 90.

The controller 90 may be provided as at least one processor operating by a predetermined program, and the predetermined program performs each step of a method for controlling the hybrid vehicle according to an exemplary form of the present disclosure The controller 90 determines a driving region of the engine based on the driving information detected by the driving information detector 80, and controls the electric superchargers to be operated in a single mode, a serial mode, or a parallel mode based on the driving region of the engine.

Figure 4:
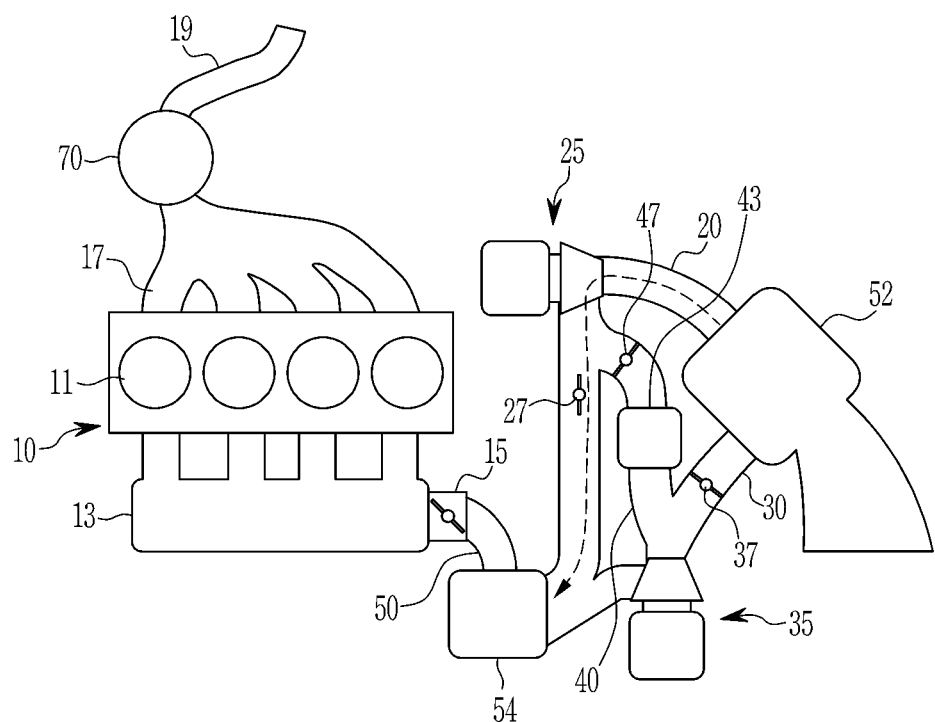
FIG. 4 is a schematic view illustrating an operation of an engine system in a single mode as applied to a hybrid vehicle in one form of the present disclosure.

The single mode is a mode that intake air compressed by one of a plurality of electric superchargers is supplied to the cylinder 11. Referring to FIG. 4, in the single mode, the controller 90 controls the second intake valve 37 and the connecting valve 47 to be closed, the second electric supercharger 35 to be stopped, the first intake valve 27 to be opened and the first electric supercharger 25 to be operated, such that intake air compressed by the first electric supercharger 25 and supplied to the cylinder 11. In another case, the controller 90 controls the first intake valve 27 and the connecting valve 47 to be closed, the first electric supercharger 25 to be stopped, the second intake valve 37 to be opened, and the second electric supercharger 35 to be operated, such that intake air compressed by the second electric supercharger 35 and supplied to the cylinder 11.

Figure 5:
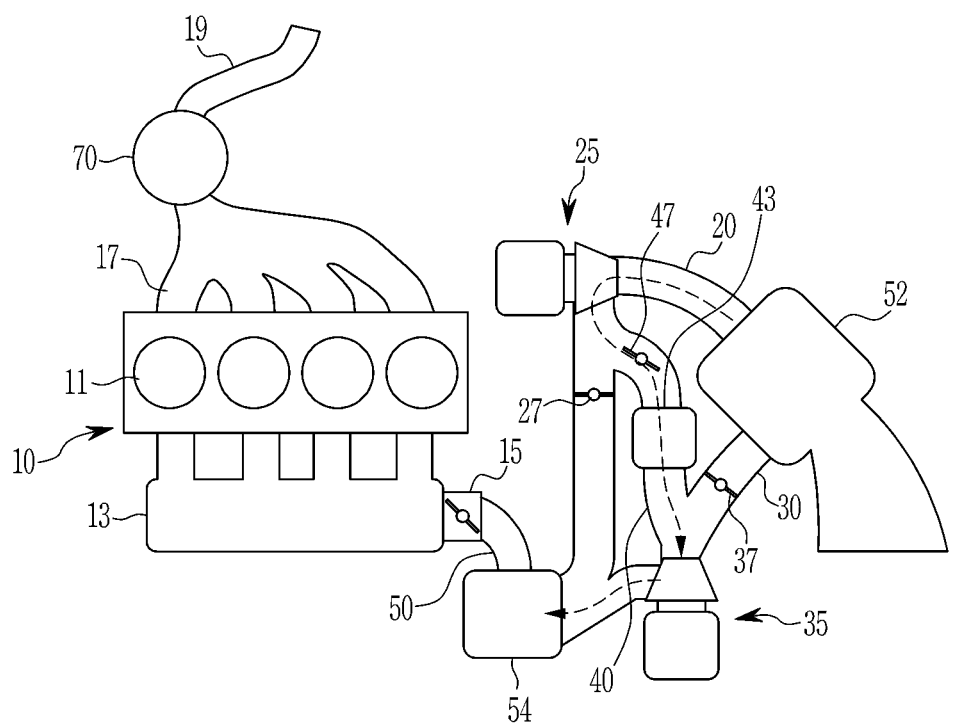
FIG. 5 is a schematic view illustrating an operation of an engine system in a serial mode as applied to a hybrid vehicle according to an exemplary form of the present disclosure.

The serial mode is a mode that intake air is doubly compressed by the first electric supercharger 25 and the second electric supercharger 35 and supplied to the cylinder 11. That is, intake air is compressed by the first electric supercharger 25, and then intake air compressed by the first electric supercharger 25 is additionally compressed by the second electric supercharger 35. Referring to FIG. 5, in the serial mode, the controller 90 controls the first intake valve 27 and the second intake valve 37 to be closed, the connecting valve 47 to be opened, and the first electric supercharger 25 and the second electric supercharger 35 to be operated, such that intake air compressed by the first electric supercharger 25 and the second electric supercharger 35 and suppled to the cylinder 11.

Figure 6:
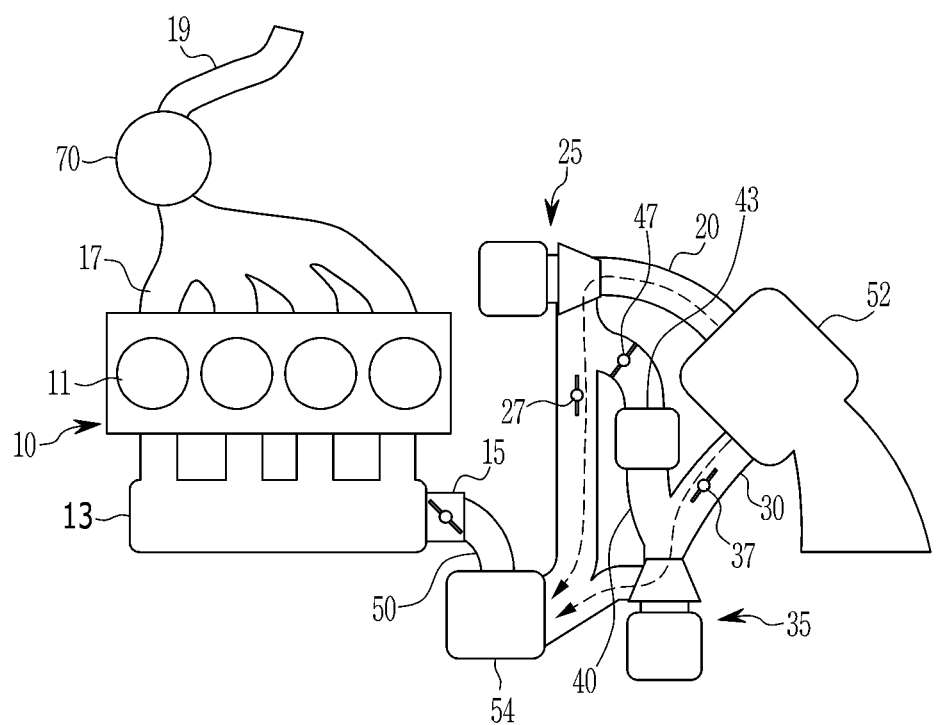
FIG. 6 is a schematic view illustrating an operation of an engine system in a parallel mode as applied to a hybrid vehicle according to an exemplary form of the present disclosure.

The parallel mode is a mode that intake air compressed by the first electric supercharger 25 and intake air compressed by the second electric supercharger 35, respectively, are supplied to the cylinder 11. Referring to FIG. 6, in the parallel mode, the controller 90 controls the connecting valve 47 to be closed, the first intake valve 27 and the second intake valve 37 to be opened, and the first electric supercharger 25 and the second electric supercharger 35 to be operated, such that intake air compressed by the first electric supercharger 25 and the second electric supercharger 35 is respectively supplied to the cylinder 11.

Hereinafter, a method of controlling a hybrid vehicle according to an exemplary form of the present disclosure will be described in detail with reference to accompanying drawings.

Figure 7:
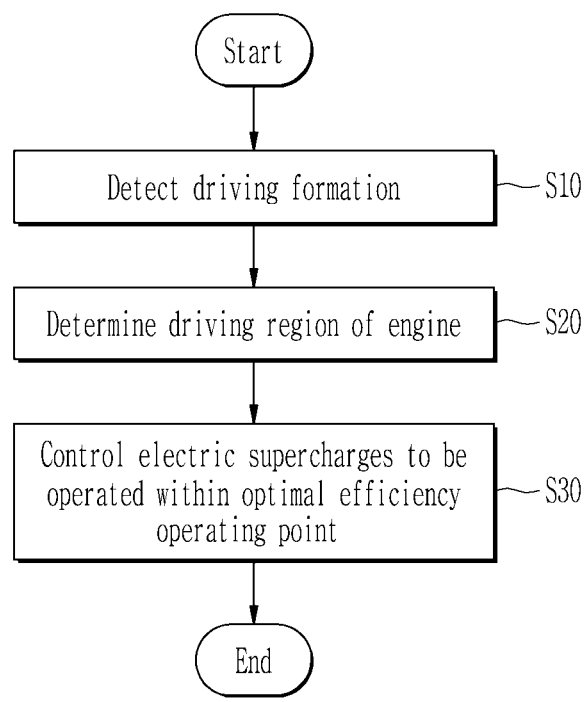
FIG. 7 is a flowchart illustrating a method of controlling a hybrid vehicle according to an exemplary form of the present disclosure.

FIG. 7 is a flowchart illustrating a method of controlling a hybrid vehicle according to an exemplary form of the present disclosure.

As shown in FIG. 7, the driving information detector 80 detects driving information including an engine speed and an engine torque, and the driving information detected by the driving information detector 80 is transmitted to the controller 90 at step S10.

Figure 8:
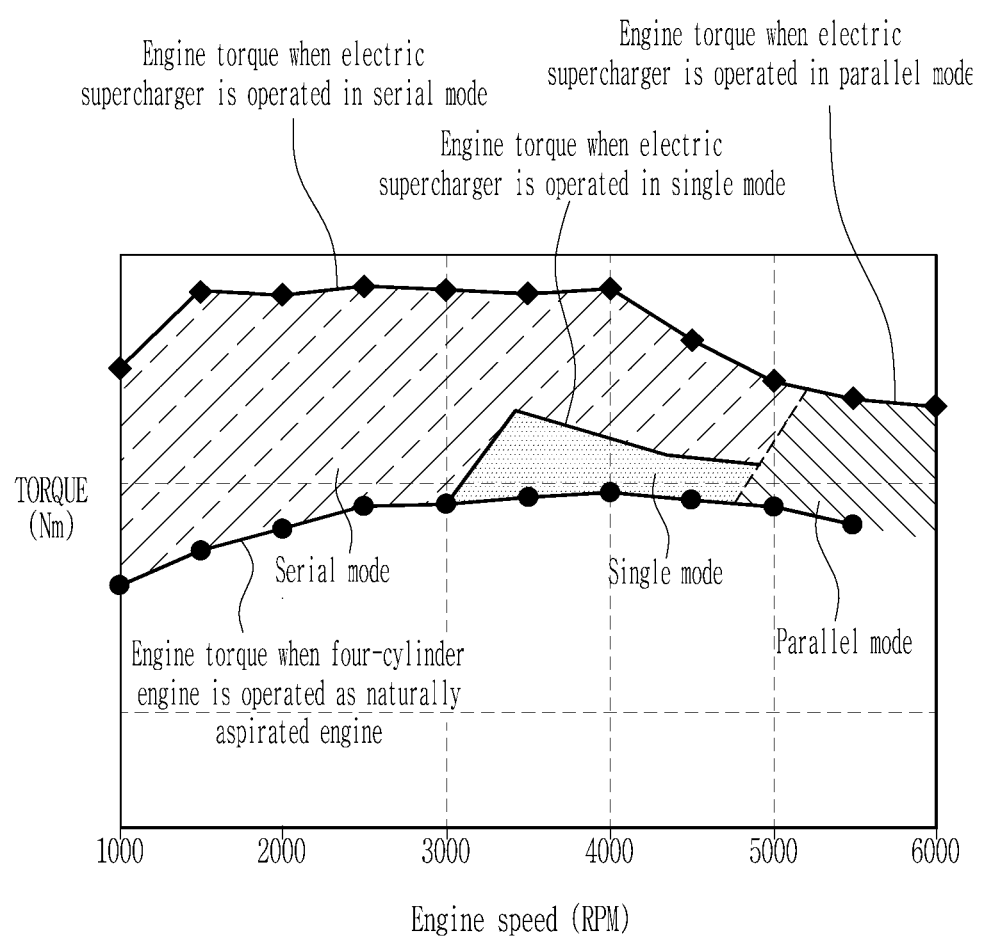
FIG. 8 is a graph illustrating an operating region of the engine system applied to a hybrid vehicle according to an exemplary form of the present disclosure.

The controller 90 determines an operating region of the engine based on the driving information detected by the driving information detector 80 at step S20. Referring to FIG. 8, the operating region of the engine may be divided into a low speed and low load region, a low speed and high load region, a middle speed and middle load region, a middle speed and high load region, a high speed and middle load region, and a high speed and high load region.

The controller 90 may control the electric supercharger 25 to be operated in an optimal efficiency operating point (or optimal efficiency operating region) based on the operating region of the engine at step S30. Here, the optimal efficiency operating point (or region) means an operating point or region where the efficiency of the pressure ratio by each electric supercharger is the maximum with respect to a flow rate through each electric supercharger. The electrical energy consumption of the electric supercharger at the optimal efficiency operating point becomes minimal.

That is, the controller may determine an operating mode of the electric supercharger such that the pressure ratio of the electric supercharger is positioned in the optimal operating point. In this case, the flow rate and the boost pressure of the intake air supplied to the combustion chamber through the electric supercharger are satisfied when the pressure ratio of the electric supercharger is within the optimal operating point.

Figure 9:
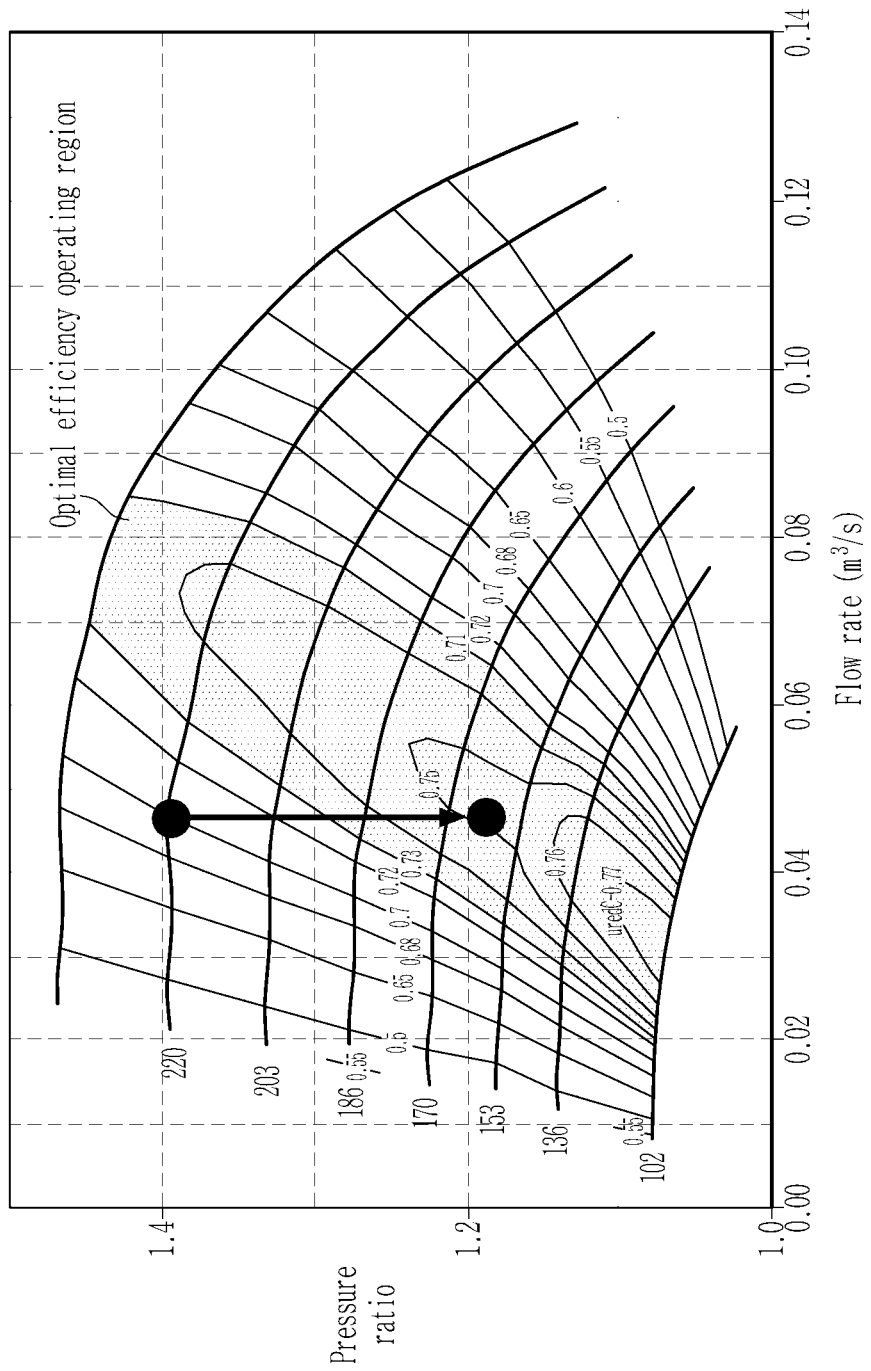
FIG. 9 and FIG. 10 are graphs illustrating operating point of an electric supercharger according to an exemplary form of the present disclosure.
Figure 10:
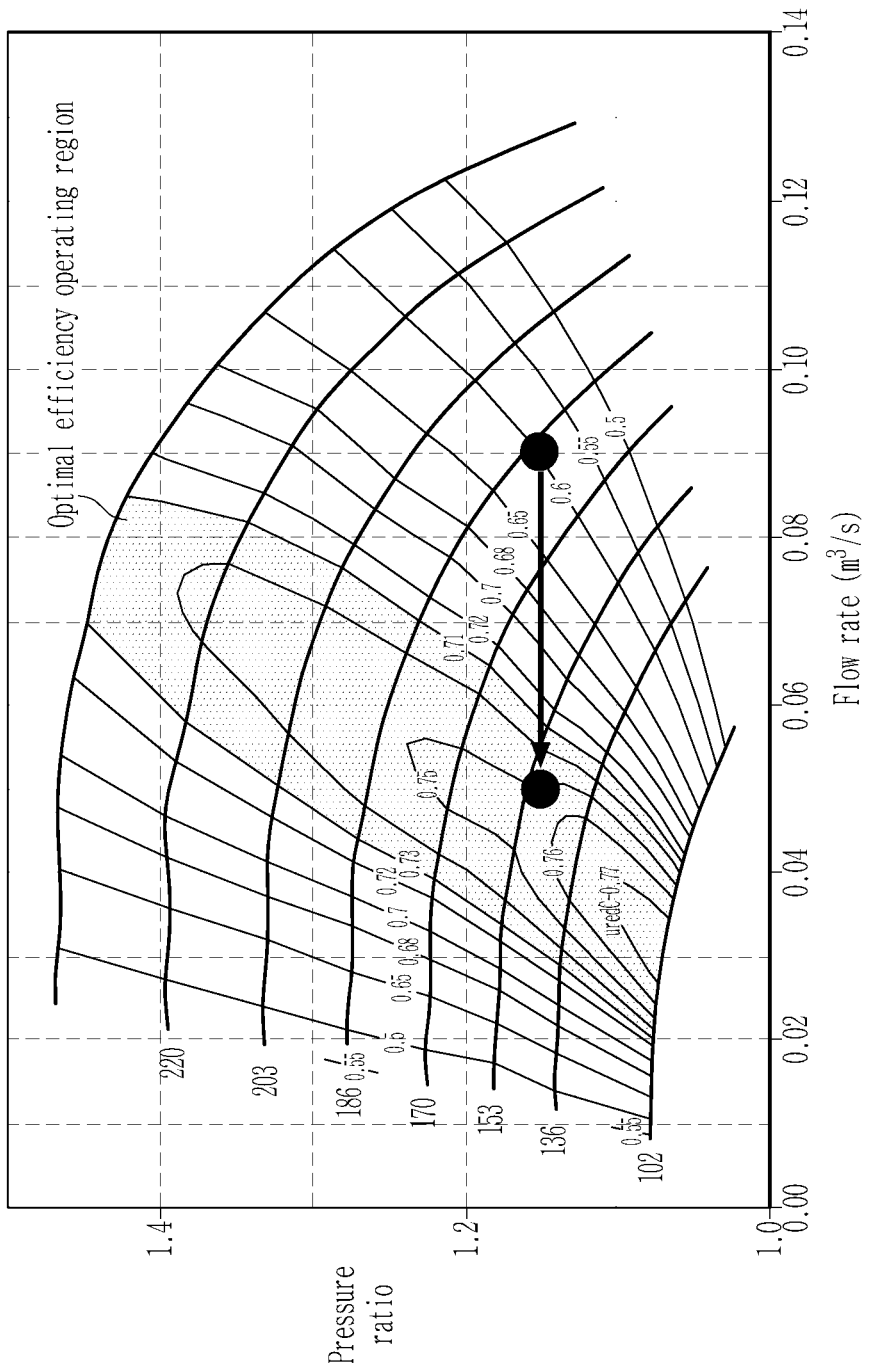

Referring to FIG. 9, when the driving region of the engine is a low flow rate region such as the low speed and low load region, the low speed and high load region, or the middle speed and high load region (hereinafter, will be referred to a 'first driving region'), it may happen that the pressure ratio of the electric supercharger to satisfy boost pressure supplied to the combustion chamber deviates from the optimal efficiency operating point (e.g., 1.4). In this case, when the electric supercharger operates in the single mode, the electric supercharger deviates from the optimal efficiency operating point, thereby deteriorating energy consumption efficiency.

However, when the electric supercharger is operated in the serial mode by the controller, the two electric superchargers may be operated within the optimal efficiency operating point in a state where the flow rate supplied to the combustion chamber is same as the flow rate in the single mode. In this case, the pressure ratio of each of the electric superchargers may be about 1.18, and since intake air is doubly compressed by the two electric superchargers operated in the optimal efficiency operating point (e.g., the intake air is compressed by the first electric supercharger, then compressed air is additionally compressed by the second electric supercharger), it is possible to meet the pressure ratio 1.4 (1.18*1.18) and satisfy the boost pressure of the intake air. Accordingly, the electric supercharger is operated within the optimal efficiency operating point range to improve energy efficiency.

In this case, the controller 90 controls the first intake valve 27 and the second intake valve 37 to be closed, the connecting valve 47 to be opened, and the first electric supercharger 25 and the second electric supercharger 35 to be operated such that the compressed air by the two electric superchargers is supplied to the combustion chamber.

Referring to FIG. 9, when the driving region of the engine is a high speed and middle load region and a high speed and high load region (hereinafter, will be referred to a 'second driving region'), it may happen that the flow rate of the electric supercharger to satisfy the flow rate of the intake air supplied to the combustion chamber deviates from the optimal efficiency operating point (e.g., 0.09 m$^2$/s). In this case, when the electric supercharger operates in the single mode, the electric supercharger deviates from the optimal efficiency operating point, thereby deteriorating energy consumption efficiency.

However, when the electric supercharger is operated in the parallel mode by the controller, the two electric superchargers may be operated within the optimal efficiency operating point in a state where the pressure ratio of the electric supercharger is same as the single mode. In this case, the flow rate supplied to the combustion chamber by the electric supercharger may be about 0.045 m$^2$/s. The supercharged air compressed by the two electric supercharger operated in the optimal efficiency operating point may meet the flow rate 0.09 m$^2$/s (0.045 m$^2$/s+0.045 m$^2$/s) supplied to the combustion chamber. Accordingly, the electric supercharger is operated within the optimal efficiency operating point range to improve energy efficiency.

In this case, the controller 90 controls the connecting valve 47 to be closed, the first intake valve 27 and the second intake valve 37 to be opened, and the first electric supercharger 25 and the second electric supercharger 35 to be operated such that the compressed air by the two electric superchargers is supplied to the combustion chamber.

When the flow rate and the boost pressure to be supplied to the combustion chamber is satisfied by one electric supercharger operated within the optimal efficiency operating point range, the controller may control the electric superchargers to be operated in the single mode.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

10: engine
11: combustion chamber
13: intake manifold
15: throttle valve
16: integrated starter-generator
17: exhaust manifold
20: first intake line
25: first electric supercharger
27: first intake valve
30: second intake line
35: second electric supercharger
37: second intake valve
40: bypass line
43: complementary intercooler
47: bypass valve
50: main intake line 52: air cleaner
54: main intercooler
70: catalytic converter
80: driving information detector
90: controller
110: drive motor
130: transmission
150: battery

What is claimed is:

1. A hybrid vehicle comprising:
an engine including a plurality of cylinders configured to generate a driving torque by burning fuel;
a drive motor configured to generate a driving torque using electric energy supplied from a battery and assist the driving torque of the engine;
an engine clutch disposed between the engine and the drive motor, and configured to selectively connect the engine to the drive motor;
a first intake valve disposed in a first intake line in which intake air supplied to a combustion chamber flows;
a second intake valve disposed in a second intake line in which intake air supplied to the combustion chamber flows;
a first electric supercharger disposed in the first intake line;
a second electric supercharger disposed in the second intake line;
a connecting valve disposed in a connecting line configured to connect the first intake line to the second intake line; and
a controller configured to determine an operating mode among a plurality of operating modes of the first and the second electric superchargers based on a pressure ratio and a flow rate of the intake air supplied by each of the first and the second electric superchargers,
wherein
the plurality of operating modes include a single mode, a serial mode, and a parallel mode, and
wherein:
in the single mode, intake air compressed by one of the first and second electric superchargers is supplied to the combustion chamber,
in the serial mode, intake air compressed in series by the first electric supercharger and the second electric supercharger is supplied to the combustion chamber, and
in the parallel mode, intake air compressed in parallel by the first electric supercharger and intake air compressed by the second electric supercharger, respectively, are supplied to the combustion chamber.

2. The hybrid vehicle of claim 1, wherein
the controller is configured to control the first and the second electric superchargers to be operated in the serial mode when the pressure ratio supplied by one of the first and second electric superchargers does not satisfy a boost pressure in the combustion chamber to run the engine within an optimal efficiency operating region.

3. The hybrid vehicle of claim 1, wherein
the controller is configured to control the first and the second electric superchargers to be operated in the parallel mode when the flow rate of the intake air supplied by one of the first and second electric superchargers does not satisfy a flow rate of the intake air into the combustion chamber to run the engine within an optimal efficiency operating region.

4. The hybrid vehicle of claim 1, wherein in the single mode, the controller is configured to:
close the second intake valve and the connecting valve,
stop the second electric supercharger,
open the first intake valve, and
operate the first electric supercharger such that the intake air compressed by the first electric supercharger is supplied to the combustion chamber.

5. The hybrid vehicle of claim 1, wherein in the single mode, the controller is configured to:
close the first intake valve and the connecting valve,
stop the first electric supercharger,
open the second intake valve, and
operate the second electric supercharger such that the intake air compressed by the second electric supercharger is supplied to the combustion chamber.

6. The hybrid vehicle of claim 1, wherein in the serial mode,
the controller is configured to:
close the first intake valve and the second intake valve,
open the connecting valve, and
operate the first electric supercharger and the second electric supercharger such that the intake air doubly compressed by the first and the second electric superchargers is supplied to the combustion chamber.

7. The hybrid vehicle of claim 1, wherein in the parallel mode,
the controller is configured to:
close the connecting valve,
open the first intake valve and the second intake valve, and
operate the first electric supercharger and the second electric supercharger such that the intake air compressed by each of the first and the second electric superchargers is separately supplied to the combustion chamber.

8. The hybrid vehicle of claim 1, wherein:
the first intake valve is disposed in a downstream portion of the first electric supercharger, and
the second intake valve is disposed in an upstream portion of the second electric supercharger.

9. The hybrid vehicle of claim 1, further comprising:
a main intercooler disposed in a main intake line that the first intake line and the second intake line are merged.

10. The hybrid vehicle of claim 1, further comprising:
a complementary intercooler disposed in the connecting line.

* * * * *